US010459188B2

United States Patent
Sakamoto

(10) Patent No.: US 10,459,188 B2
(45) Date of Patent: Oct. 29, 2019

(54) ELECTRONIC COMPONENT AND IMAGING DEVICE

(71) Applicant: IRISO ELECTRONICS CO., LTD., Kanagawa (JP)

(72) Inventor: Tetsuma Sakamoto, Kanagawa (JP)

(73) Assignee: IRISO ELECTRONICS CO., LTD., Kanagawa (JP)

( * ) Notice: Subject to any disclaimer, the term of this patent is extended or adjusted under 35 U.S.C. 154(b) by 0 days.

(21) Appl. No.: 15/835,946

(22) Filed: Dec. 8, 2017

(65) Prior Publication Data

US 2018/0164528 A1    Jun. 14, 2018

(30) Foreign Application Priority Data

Dec. 14, 2016    (JP) .................. 2016-242557

(51) Int. Cl.
| | |
|---|---|
| *H04N 5/225* | (2006.01) |
| *G02B 7/02* | (2006.01) |
| *B60R 11/04* | (2006.01) |
| *G03B 17/02* | (2006.01) |
| *H01R 13/42* | (2006.01) |
| *G03B 17/08* | (2006.01) |
| *H01R 13/52* | (2006.01) |
| *H01R 13/74* | (2006.01) |

(52) U.S. Cl.
CPC .............. *G02B 7/02* (2013.01); *B60R 11/04* (2013.01); *G03B 17/02* (2013.01); *G03B 17/08* (2013.01); *H01R 13/42* (2013.01); *H04N 5/2252* (2013.01); *H04N 5/2257* (2013.01); *H01R 13/521* (2013.01); *H01R 13/746* (2013.01)

(58) Field of Classification Search
CPC .... H04N 5/2252; H04N 5/2257; G03B 17/08; G03B 17/02; H01R 13/42; H01R 13/521; G02B 7/02; B60R 11/04
See application file for complete search history.

(56) References Cited

U.S. PATENT DOCUMENTS

| | | | |
|---|---|---|---|
| 5,259,790 A | 11/1993 | Hayward | |
| 2005/0275725 A1* | 12/2005 | Olsson | G03B 37/005 348/207.99 |

(Continued)

FOREIGN PATENT DOCUMENTS

| | | |
|---|---|---|
| DE | 102014117648 A1 | 6/2016 |
| EP | 1182740 A2 | 2/2002 |

(Continued)

OTHER PUBLICATIONS

Extended European Search Report for European Patent App. No. 17206160.8 (dated Apr. 12, 2018).

*Primary Examiner* — Lin Ye
*Assistant Examiner* — John H Morehead, III
(74) *Attorney, Agent, or Firm* — Cermak Nakajima & McGowan LLP; Tomoko Nakajima

(57) ABSTRACT

To provide an electronic component and an imaging device including the electronic component, which can readily integrate the connector portion to the housing. The shielding member includes a screw portion. The screw portion is fastened by being screwed to a screw hole of a holding wall of a case portion configuring a rear housing. An external connection connector can be readily integrated to the rear housing in the above manner.

6 Claims, 4 Drawing Sheets

(56) References Cited

U.S. PATENT DOCUMENTS

| | | | | |
|---|---|---|---|---|
| 2006/0171704 A1* | 8/2006 | Bingle | ............... | B60R 11/04 |
| | | | | 396/419 |
| 2010/0103540 A1* | 4/2010 | An | ............... | G02B 7/021 |
| | | | | 359/819 |
| 2011/0063498 A1* | 3/2011 | An | ............... | H04N 5/2252 |
| | | | | 348/375 |
| 2011/0234803 A1* | 9/2011 | Nakajima | ............... | H04N 5/2254 |
| | | | | 348/148 |
| 2011/0293264 A1* | 12/2011 | Sato | ............... | G03B 3/10 |
| | | | | 396/529 |
| 2012/0014687 A1* | 1/2012 | Sanford | ............... | G03B 17/02 |
| | | | | 396/535 |
| 2012/0069165 A1* | 3/2012 | Choi | ............... | H04N 1/00413 |
| | | | | 348/61 |
| 2014/0118612 A1 | 5/2014 | Koshiba | | |
| 2014/0148030 A1* | 5/2014 | Makimura | ............... | H01R 13/5219 |
| | | | | 439/271 |
| 2015/0205186 A1* | 7/2015 | Park | ............... | G03B 17/08 |
| | | | | 348/373 |
| 2015/0255908 A1* | 9/2015 | Takamura | ............... | H01R 13/2414 |
| | | | | 439/370 |
| 2015/0327377 A1* | 11/2015 | Mano | ............... | H05K 5/0069 |
| | | | | 361/807 |
| 2016/0173746 A1* | 6/2016 | Chien | ............... | F21V 33/0052 |
| | | | | 348/159 |
| 2017/0271819 A1* | 9/2017 | Hehir | ............... | H01R 13/6583 |

FOREIGN PATENT DOCUMENTS

| | | |
|---|---|---|
| JP | 2013-003244 A | 1/2013 |
| JP | 2015-170526 A | 9/2015 |

* cited by examiner

ELECTRONIC COMPONENT AND IMAGING DEVICE

BACKGROUND OF THE INVENTION

1. Field of the Invention

The present disclosure relates to an electronic component and, particularly, relates to an electronic component for an imaging device, such as an on-vehicle camera, and an imaging device including the same.

2. Description of the Related Art

An on-vehicle imaging device is used in a drive recorder of a vehicle and to improve visibility behind a vehicle. Such an imaging device includes a substrate on which an image pickup element, such as a CMOS, is mounted and an imaging component, such as a connector. An imaging signal (an electric signal) generated by the image pickup element is output to an external device through a harness connected to the imaging device.

As an example of the external device connection for connecting such a harness, for example, there is a known connector for an electronic apparatus in Japanese Unexamined Patent Application Publication No. 2015-170526 (FIG. 3, connector 30 for electronic apparatus) including a tubular resin connector housing, a tubular metal external conductor held inside the connector housing, a tubular dielectric held inside the external conductor, and a pin-shaped internal conductor that is inserted in the dielectric along an axial direction of the tubular dielectric. According to the above connector, the external conductor disposed outside the dielectric is capable of functioning as an electromagnetic wave shield that protects the internal conductor serving as a transmission path of an imaging signal. Particularly, the connector has a feature in that the connector is suitable for high speed transmission of imaging signals. On the other hand, as signal processing is becoming more advanced in imaging devices, a measure against heat generation of built-in electronic components has become an issue. In other words, in the connector for an electronic device described above, since the connector housing that accommodates the external conductor, the dielectric, and the internal conductor is made of resin, it is difficult to efficiently radiate the heat, which has been generated by the electronic component and which has been accumulated inside the imaging device, to the outside of the connector housing.

One effective measure against such generation of heat of the imaging device is to form the connector housing with metal, such as aluminum that has good thermal conductivity. Japanese Unexamined Patent Application Publication No. 2013-3244 (FIG. 3) discloses an imaging device including a metal housing. It can be conceived that a preferable imaging device configuration that has advantages of both of the above can be obtained by combining the connector for an electronic device in Japanese Unexamined Patent Application Publication No. 2015-170526 (FIG. 3, connector 30 for electronic apparatus) described above that is effective in electromagnetic wave shielding together with the metal housing in Japanese Unexamined Patent Application Publication No. 2013-3244 (FIG. 3) that is effective in radiating heat.

SUMMARY OF THE INVENTION

However, mere combination of the connector for an electronic device in Japanese Unexamined Patent Application Publication No. 2015-170526 (FIG. 3, connector 30 for electronic apparatus) and the metal housing in Japanese Unexamined Patent Application Publication No. 2013-3244 (FIG. 3) is not sufficient. In other words, one can conceive of a method of manufacturing the above in which, for example, the metal housing in Japanese Unexamined Patent Application Publication No. 2013-3244 (FIG. 3) is manufactured by a die cast process, and during the above process, the external conductor, the dielectric, and the internal conductor in Japanese Unexamined Patent Application Publication No. 2015-170526 (FIG. 3, connector 30 for electronic apparatus) that are integrated as a single piece of built-in connector component is inserted. However, the above has problems such as the mold construction becoming complex and costly, and the manufacturing thereof being difficult since the connector component is inserted.

The present disclosure has been made in the content of the above conventional technique. An object thereof is to provide an electronic component capable of readily integrating the connector to the housing. Furthermore, another object is to provide an imaging device that includes such an electronic component.

In order to achieve such objects, the present disclosure is devised with the following configuration.

The present disclosure is an electronic component including a housing that accommodates an imaging component, the housing including an external device connection that conductively connects the imaging component and an external device to each other, and the external device connection including an internal conductor that becomes conductively connected to the external device, and a tubular external conductor that accommodates the internal conductor, in which a screw portion is provided on an outer peripheral surface of the external conductor, and a screw hole is provided in the housing, the screw hole holding the external conductor by having the screw portion screwed thereto.

In the present disclosure, the external conductor can be held by the housing by screwing the screw portion of the external conductor to the screw hole of the housing; accordingly, the external device connection can be readily integrated to the housing.

The housing may be a metal housing. With the above, the electronic component may be obtained that includes the metal external conductor that is effective in shielding the internal conductor from the electromagnetic wave while the inner heat is effectively radiated to the outside with the metal housing. Furthermore, since the housing is made of metal, not only the electromagnetic wave shielding effect of the external conductor on the internal conductor, but also the electromagnetic wave shielding effect of the housing can be exerted on the internal conductor. Furthermore, the housing is capable of exerting a shielding effect that prevents the electromagnetic wave noise of the imaging component disposed between the housing and the external conductor from leaking out of the imaging device and also, a shielding effect, opposite to the above, that prevents the electromagnetic wave noise from entering the imaging device from the outside towards the inside can be exerted. The metal housing may be a die cast body of an aluminum alloy, for example. The die cast body allows rapid mass production with a high dimensional accuracy, and a metal housing with a high quality can be manufactured with a high manufacturing efficiency.

The housing may be a resin housing that is a resin molded body. Compared with a metal housing, the imaging device can be lighter in weight with the resin housing.

A waterproof sealing portion may be provided at a boundary between the housing and the external conductor. With the above, the area where the sealing portion is provided can be limited to a narrow area along the outer peripheral surface of the external conductor and the housing can be reduced in size.

In order to further achieve the object described above, the present disclosure provides an imaging device that includes either one of the above electronic components. With the above, an imaging device that is capable of readily integrating the external device connection to the housing can be obtained.

According to the electronic component and the imaging device of the present disclosure, an imaging device capable of readily integrating an external device connection to a housing with a screwing structure formed by a screw portion and a screw hole can be obtained. Accordingly, a further contribution to spreading imaging devices can be made.

DESCRIPTION OF THE PREFERRED EMBODIMENTS

Figure 1:
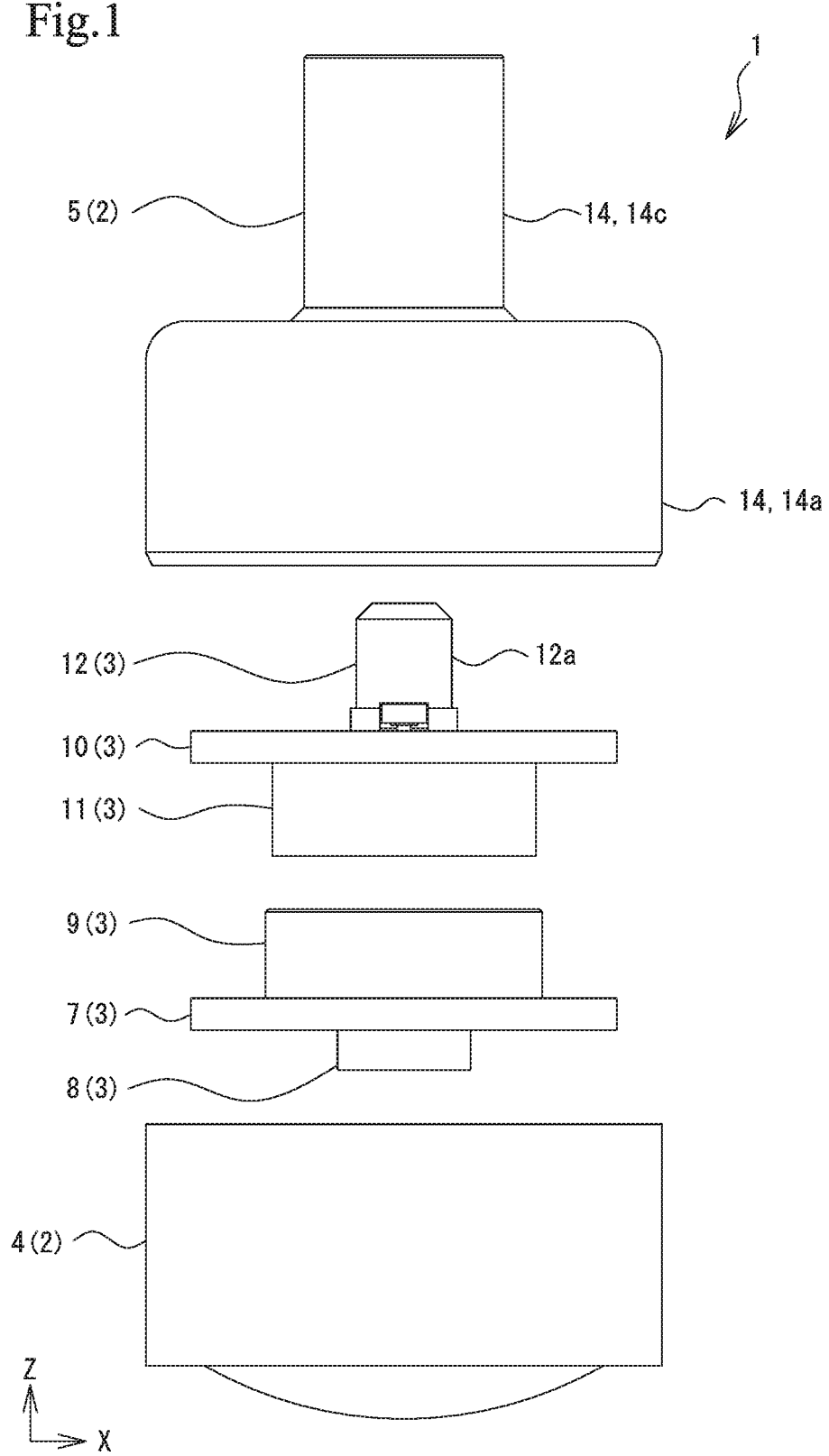
FIG. 1 is an exploded view of an imaging device according to an exemplary embodiment.

Hereinafter, an exemplary embodiment of the present disclosure will be described with reference to the drawings. In the specification, the claims, and the drawings, an X direction illustrated in FIG. 1 is the left-right direction, and a Y direction that is perpendicular to the surface of the sheet is the front-rear direction, and a Z direction is an optical axis direction and the height direction of the imaging device. However, while the left, the right, the front, the rear, up, and down described above are specified, the above directions do not limit the mounting direction and the use direction of the electronic component, the imaging device, and the like of the present disclosure.

As illustrated in an overview in FIG. 1, an imaging device 1 includes a housing 2 and an imaging component 3.

The housing 2 includes a front housing 4 and a rear housing 5, and the imaging component 3 is accommodated inside an inner space 6 of the housing 2. The imaging component 3 exemplified in the exemplary embodiment includes an image pickup element 8 and an inter-substrate connecting connector 9 mounted on a first substrate 7, and an inter-substrate connecting connector 11 and a substrate-side connector 12 mounted on a second substrate 10. Circuit wiring of a signal processing system and various elements (not shown) are mounted on the first substrate 7 and the second substrate 10, and the circuit wiring of the signal processing system and the various elements are in conductive communication with each other through the inter-substrate connecting connectors 9 and 11. The substrate-side connector 12 is fitted and connected to an external connection connector 13 serving as an "external device connection" provided in the rear housing 5.

The external connecting connector 13 is fitted and connected to a harness component (not shown), and the harness component is connected to an external device. As described above, an imaging signal generated by the imaging component 3 of the imaging device 1 is transmitted to the external device from the external connection connector 13 of the rear housing 5 through the harness component. The feature of the imaging device 1 having the outlined configuration described above is the rear housing 5; accordingly, the feature thereof will be described in further detail.

Rear Housing 5

The rear housing 5 includes a case portion 14 and the external connection connector 13 described above.

The case portion 14 includes a polygonal tube-shaped tubular peripheral wall 14a, a wall portion 14b formed on one end side of the tubular peripheral wall 14a, and a fitting portion 14c that protrudes in a tubular manner from the wall portion 14b. The case portion 14 of the present exemplary embodiment is manufactured by an aluminum alloy die cast process. A die cast body manufactured by a die cast process allows rapid mass production with a high dimensional accuracy, and a case portion 14 with a high quality can be manufactured with a high manufacturing efficiency.

The front housing 4 that is, similar to the rear housing 5, manufactured by an aluminum alloy die cast process is mounted on an opening edge 14d formed on the other end side of the tubular peripheral wall 14a. A fitting chamber 14c1 to which the harness component (not shown) is fitted and connected by being inserted therein is formed inside the fitting portion 14c. Furthermore, a holding wall 14e is formed inside the fitting portion 14c. A screw hole 14e1, which is a female screw, to which the external connection connector 13 is screwed and connected is formed in the holding wall 14e. A recess 14f is formed on the wall portion 14b side of the holding wall 14e, and a tubular sealing portion 15 in which a waterproof seal material is filled is formed inside the recess 14f. The sealing portion 15 is only formed between the inner side of the recess 14f and the external connection connector 13 and is not formed on other inner surfaces of the wall portion 14b. The area where the sealing portion 15 is formed is small. Accordingly, compared with a configuration in which a sealing portion is provided on the inner surface of the wall portion 14b, the area of the wall portion 14b can be made small, and the case portion 14 can be reduced in size in the XY direction.

The external connection connector 13 includes a shielding member 16 serving as an "external conductor", a dielectric 17, a pin terminal 18 serving as an "internal conductor", and a female terminal 19.

The shielding member 16 is formed of a cylindrical metal material. A tubular portion 16a and a connector portion 16b are formed in the shielding member 16. The shielding member 16 is formed so as to have a length in the Z direction that is longer than a length of the pin terminal 18 so that an electromagnetic wave shielding effect can be exerted across the entire length of the pin terminal 18.

The dielectric 17 is disposed inside the tubular portion 16a. A screw portion 16c, which is a male screw, screwed to the screw hole 14e1 of the case portion 14 described above is formed on an outer peripheral surface of the tubular portion 16a. An annular protrusion 16d is formed on a lower end side of the screw portion 16c. When the screw portion 16c and the screw hole 14e1 are screwed and fastened together, the protrusion 16d abuts against and adheres to the holding wall 14e inside the recess 14f. Together with the above, waterproofing property is increased by the sealing portion 15 filled between the recess 14f and an outer peripheral surface of the connector portion 16b sealing in an annular manner.

Figure 2:
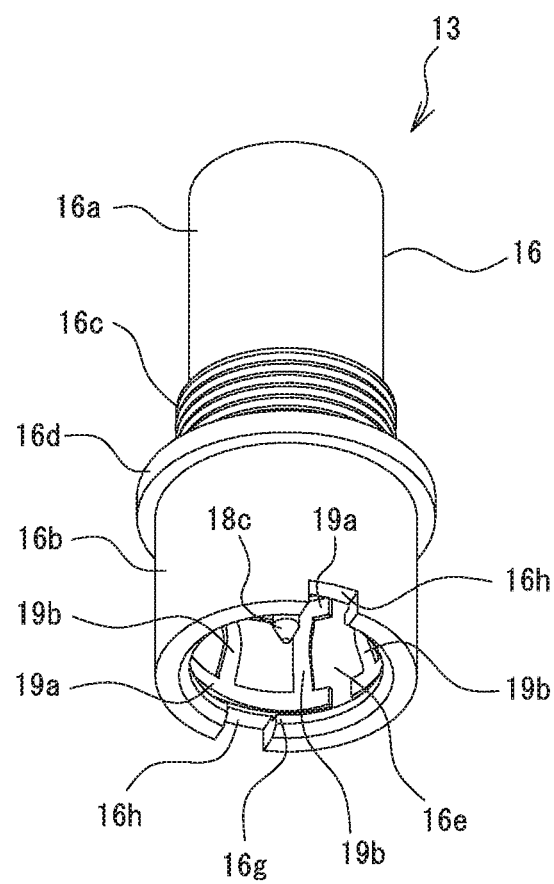
FIG. 2 is a perspective view of an appearance of an external connection connector according to an exemplary embodiment.
Figure 3:
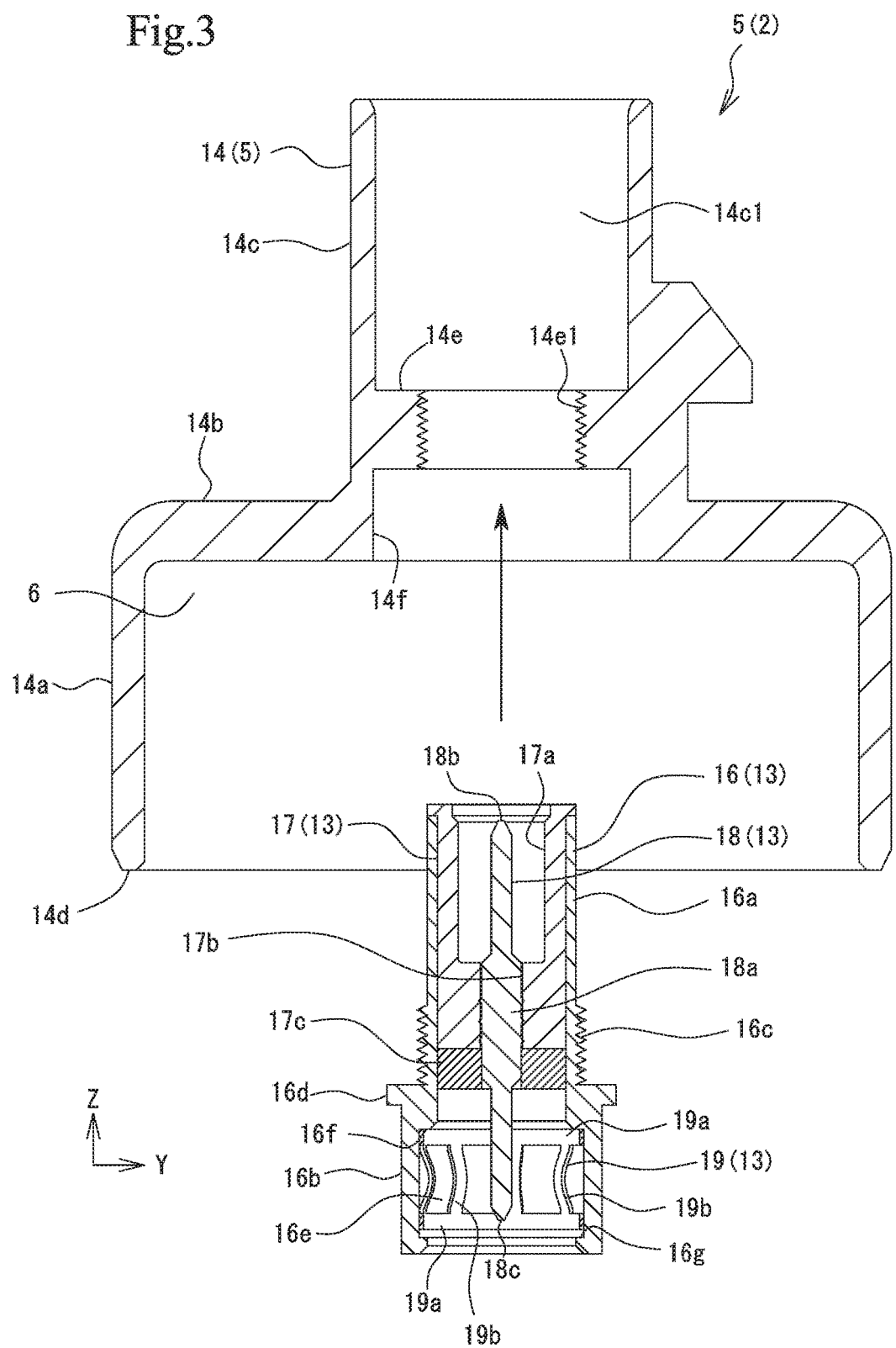
FIG. 3 is an explanatory drawing in which the external connection connector is installed in a case portion.

The connector portion 16b is formed so as to have a diameter that is larger than that of the tubular portion 16a, and the connector portion 16b is formed so as to be long enough to extend from the recess 14f and protrude into the inner space 6 of the rear housing 5. An inner space of the connector portion 16b is a fitting chamber 16e of the substrate-side connector 12. The female terminal 19 is disposed inside the connector portion 16b. As illustrated in FIG. 2, a pair of locking recesses 16h that are provided on the diameter are formed on an outer peripheral rim of a lower end portion of the connector portion 16b. By engaging a flathead screwdriver in the locking recesses 16h, the screw portion 16c of the shielding member 16 can be screwed to the screw hole 14e1 of the case portion 14.

The female terminal 19 is a member conductively connected to the substrate-side connector 12 and includes a pair of annular portions 19a positioned on one side and the other side in the Z direction, and curved contact spring pieces 19b that connect the annular portions 19a. The contact spring pieces 19b are disposed in a plural number so as to be spaced apart in the circumferential direction of the connector portion 16b and the circumferential direction of the annular portions 19a. The contact spring pieces 19b receiving the pressing force of the substrate-side connector 12 inserted therein become elongated such that the curvature thereof is eased, and are displaced in a direction moving the pair of annular portions 19a away from each other. By having the annular portions 19a abut against an enlarged diameter step portion 16f and a stopper lock piece 16g of the connector portion 16b, the displacement of the annular portions 19a are restricted before the curved shapes of the contact spring pieces 19b becomes squashed flat. With the above, the contact spring pieces 19b exert press contact force on the substrate-side connector 12. The female terminal 19 configured in the above manner is stopped from coming off from the connector portion 16b by abutment against the stopper lock piece 16g.

The dielectric 17 is held by being pressed fitted inside the shielding member 16, and holds the shielding member 16 and the pin terminal 18 in an insulated state. A tubular fitting hole 17a is formed in the dielectric 17. A terminal of the harness component (not shown) is inserted into the fitting hole 17a so as to be in conductive contact with the pin terminal 18. An insertion and holding portion 17b of the pin terminal 18 is formed on a lower side of the fitting hole 17a. The pin terminal 18 is held by the insertion and holding portion 17b by being pressed-fitted therein. A waterproof sealing portion 17c similar to the sealing portion 15 described above is formed on the underside of the dielectric 17 so that water content does not pass through a minute gap between the pin terminal 18 and the insertion and holding portion 17b.

The pin terminal 18 is formed of a conductive metal material and is a member that transmits an imaging signal (an electric signal) from the imaging component 3 to the harness component (not shown). The pin terminal 18 is held by the dielectric 17 by press-fitting a base portion 18a into the insertion and holding portion 17b of the dielectric 17. A round and rod-shaped harness-side connection 18b that protrudes in the fitting hole 17a of the dielectric 17 is formed on one end side of the base portion 18a, and a round and rod-shaped connector-side connection 18c that protrudes in the fitting chamber 16e of the connector portion 16b is formed on the other end side of the base portion 18a. The connector-side connection 18c is in conductive communication with the substrate-side connector 12 described next.

Substrate-Side Connector 12

The substrate-side connector 12 includes an outer shell wall 12a, a housing 12b, and a terminal 12c.

The outer shell wall 12a forms an outer peripheral surface of the substrate-side connector 12 and is formed of a cylindrical sheet metal. An opening 12a1 is formed at an upper end of the outer shell wall 12a, and a substrate connected portion 12a2 soldered to the second substrate 10 is formed at the lower end of the outer shell wall 12a. By being in conductive contact with the contact spring pieces 19b of the female terminal 19 of the external connection connector 13 described above, the outer shell wall 12a conductively communicates the second substrate 10 and shielding member 16 to each other.

The housing 12b is formed of a cylindrical resin molded body. The housing 12b is press-fitted inside the outer shell wall 12a and is held therewith. A hole-like fitting chamber 12b1 is formed in the housing 12b along the central axis. A portion of the fitting chamber 12b1 that corresponds to the contact pieces 12c1 of the terminal 12c described later is formed in a tapered shape and forms an inner space that allows outward displacement of the contact pieces 12c1. A terminal holding portion 12b2 that holds a base portion 12c2 of the terminal 12c by press-fitting is provided at a lower end of the fitting chamber 12b1.

The terminal 12c is formed of a conductive metal material and includes the pair of contact pieces 12c1 and the base portion 12c2. The terminal 12c is held by the housing 12b through the base portion 12c2. Each of the contact pieces 12c1 is formed in a cantilevered manner extending from the base portion 12c2. Each of the contact pieces 12c1 includes an elastic arm 12c3 that extends from the base portion 12c2, and a contact portion 12c4 that has a semicircular contact surface that matches an external shape of the round and rod-shaped connector-side connection 18c of the pin terminal 18. Furthermore, substrate connected portions 12c5 that are soldered to the second substrate 10 are formed in the base portion 12c2.

Figure 4:
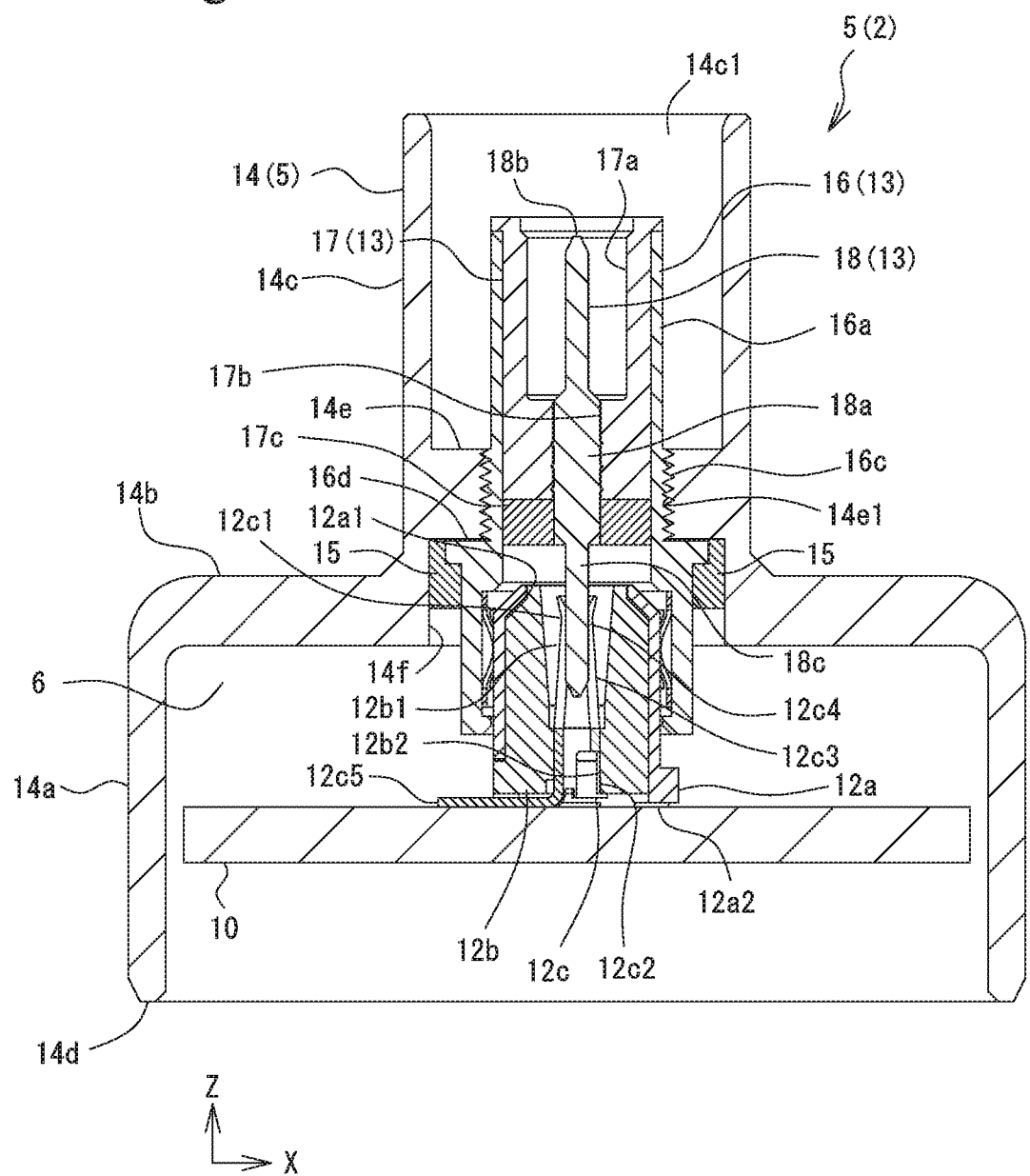
FIG. 4 is an explanatory drawing illustrating a state in which the external connection connector is in conductive contact with a substrate serving as an imaging component.

As illustrated in FIG. 4, the substrate-side connector 12 having the above-described structure is mounted on the second substrate 10. When assembling the imaging device 1, the substrate-side connector 12 serving as a male connector and the connector portion 16b of the external connection connector 13 serving as a female connector are fitted and connected to each other. When the substrate-side connector 12 is inserted and accommodated inside the fitting chamber 16d of the connector portion 16b, the outer shell wall 12a is conductively contacted to the contact spring pieces 19b of the female terminal 19. With the above, the second substrate 10 is conductively connected to the shielding member 16. Meanwhile, the connector-side connection 18c of the pin terminal 18 is inserted between the pair of contact pieces 12c1 of the terminal 12c of the substrate-side connector 12 and is conductively contacted thereto. With the above, the second substrate 10 is conductively connected to the pin terminal 18. With the fitting and connecting described above, the imaging device 1 is conductively connected to the harness component of the external device (not shown), and the imaging signal of the imaging device 1 is transmitted to an equipment main body of the external device.

Functions and Effects of Exemplary Embodiment

The functions and effects of the imaging device 1 of the present exemplary embodiment except for those that have been described will be described next.

The shielding member 16 can be fastened by screwing the screw portion 16c of the shielding member 16 to the screw hole 14e1 of the holding wall 14e. If, for example, the case portion 14 is manufactured as a die cast article having the external connection connector 13 inserted therein, problems such as the mold construction becoming complex and costly, and the manufacturing thereof being difficult since the connector component is inserted are encountered. Furthermore, for example, in a case in which the external connection connector 13 is held by being press-fitted into the case portion 14, when the harness component is fitted in the fitting hole 17a in a prized manner, or when fitted obliquely at an angle, the external connection connector 13 receives an unnatural insertion force and falls off the case portion 14, and even when not falling off, the fitted position in the Z direction may be displaced. In such a case, troubles may occur such as the second substrate 10 with the substrate-side connector 12 in between becoming bent and a crack being created in the soldered portion, or due to the displacement in the fitted position of the first substrate 7 in the Z direction, the focal length between the front housing 4 and the lens changing and the image pickup element 8 not being able to properly perform imaging.

However, with the present exemplary embodiment in which the screw portion 16c is screwed to the screw hole 14e1, the external connection connector 13 can be mounted in the case portion 14 with a simple connection work. Furthermore, since a firm connection is established by screwing the screw portion 16c and the screw hole 14e1 together, even if an unnatural insertion force described above is applied when, for example, connecting the harness component, the external connection connector 13 does not fall off from the case portion 14 or become displaced, and the initial fitting position can be maintained in a stable manner. Furthermore, since the external connection connector 13 and the case portion 14 are held with a high degree of adhesion with the screw portion 16c and the screw hole 14e1, penetration of electromagnetic wave noise can be effectively prevented as well. Furthermore, since the external connection connector 13 and the case portion 14 are screwed and connected, when there is a change in the specification of the imaging device 1, if the screw portion 16c and the screw hole 14e1 are the same, other specifications of the external connection connector 13 and the case portion 14 can be changed in accordance with the specification change. Furthermore, the external connection connector 13 is configured as a single component that have integrally combined the shielding member 16, the dielectric 17, the pin terminal 18, and the female terminal 19. Accordingly, the mounting work of the case portion 14 can be done as a mounting work of a single component, and the assembling can be performed efficiently.

Since the front housing 4 and the rear housing 5 are made of metal, while radiating the heat that has accumulated inside the housing 2 to the outside in an efficient manner, the metal shielding member 16 that is effective in shielding the pin terminal 18 from the electromagnetic wave can be provided as well. Furthermore, since the rear housing 5 is made of metal, not only the electromagnetic wave shielding effect exerted on the pin terminal 18 with the shielding member 16, but also the electromagnetic wave shielding effect on the pin terminal 18 can be exerted with the rear housing 5. Furthermore, the rear housing 5 is capable of exerting a shielding effect that prevents the electromagnetic wave noise of the imaging component 3 disposed between the rear housing 5 and shielding member 16 from leaking out of the imaging device 1 and also, a shielding effect, opposite to the above, that prevents the electromagnetic wave noise from entering the imaging device 1 from the outside towards the inside can be exerted. Accordingly, the imaging device 1 that is suitable for high-quality and high-speed transmission of an image signal (an electric signal) from the imaging component 3 can be provided.

The shielding member 16 includes the fitting chamber 16e that accommodates the substrate-side connector 12, and the fitting chamber 16e includes the female terminal 19 conductively contacted to the outer shell wall 12a of the substrate-side connector 12. When conductively connecting the shielding member 16 to the second substrate 10, one may conceive of a method in which a connector is provided in the second substrate 10. Furthermore, in the above case, when the shielding member 16 is configured as a male terminal, and the connector provided in the second substrate 10 is configured as a female connector, the area occupied by the second substrate 10 becomes large compared with a case in which the connector of the second substrate 10 is configured as a male connector, such as the substrate-side connector 12. Conversely, in the present exemplary embodiment, the connector portion 16b of the shielding member 16 is configured as a female connector including the female terminal 19, and the substrate-side connector 12 of the second substrate 10 is configured as a male connector; accordingly, the surface occupied by the second substrate 10 can be smaller.

In the female terminal 19, the plurality of contact spring pieces 19b are disposed in the circumferential direction of the connector portion 16b. Accordingly, even if a displacement occurs when the second substrate 10 is installed in the inner space 6 of the rear housing 5, the displacement of the substrate-side connector 12 can be absorbed by the elastic deformation of the plurality of contact spring pieces 19b while in a state in which the substrate-side connector 12 is fitted in the fitting chamber 16e.

The connector portion 16b is formed with a length that protrudes in the inner space 6 of the rear housing 5 through the recess 14f, and the case portion 14 and the connector portion 16b form a double shielding structure. Accordingly, the electromagnetic wave shielding effect on the pin terminal 18 can be exerted in a more readily manner.

Modifications of Exemplary Embodiment

Regarding the exemplary embodiment, various modifications can be enabled; accordingly, examples thereof will be described. In the exemplary embodiment described above, while an example including a single piece of pin terminal 18 has been given, there may be two or more pin terminals 18. In such a case, the external connection connector 13 needs to be modified in accordance with the number of pin terminals 18.

In the exemplary embodiment, the housing 2 (the front housing 4 and the rear housing 5) made of metal has been exemplified; however, the housing 2 may be a rigid resin molded body. Furthermore, among the rigid resin molded bodies, a carbon fiber reinforced resin molded body can be formed. The carbon fiber reinforced resin is a resin in which a conductive carbon fiber is dispersed and blended in a thermoplastic resin or a thermosetting resin. By using such a carbon fiber reinforced resin, the housing 2 will have an electromagnetic wave shielding performance; accordingly, the entire housing 2 will be capable of exerting an electromagnetic wave shielding effect.

What is claimed is:
1. An electronic component comprising:
a housing that accommodates an imaging component;

the housing including an external device connection that conductively connects the imaging component and an external device to each other; and wherein the external device connection includes
an internal conductor that becomes conductively connected to the external device, and
an external conductor that is formed in a tubular shape and accommodates the internal conductor, wherein a screw portion is provided on an outer peripheral surface of the external conductor, wherein a screw hole is provided in the housing, the screw hole holding the external device connection in the housing by having the screw portion screwed to the screw hole, and wherein a sealing portion, formed by filling a seal material, is provided on an internal surface of the housing so as to contact and seal the external device connection for waterproofing.

2. The electronic component according to claim 1, wherein the external conductor includes an annular protrusion that abuts against the holding wall when the screw portion and screw hole are screwed together.

3. The electronic component according to claim 1, wherein the external conductor includes locking recesses on one end portion of the external conductor.

4. The electronic component according to claim 1, wherein the housing is made of a carbon fiber reinforced resin molded body.

5. An imaging device comprising:
the electronic component according to claim 1.

6. The electronic component according to claim 1, wherein the housing provides a fitting portion which provides the screw hole inside of the fitting portion,
wherein the sealing portion is provided in between the external conductor and a recess which is adjacent to the fitting portion.

* * * * *